May 5, 1959
J. Q. ANDREWS
WEED EXTRACTING DEVICE
Filed July 1, 1955
2,885,240
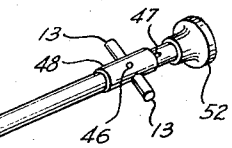
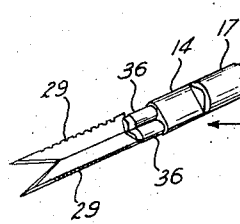
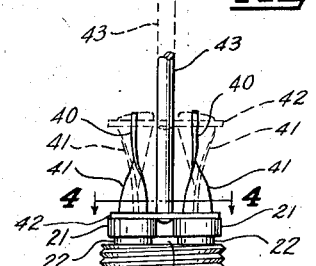
INVENTOR.
JOHN Q. ANDREWS
BY
ATTORNEY United States Patent Office 2,885,240
Patented May 5, 1959

2,885,240
WEED EXTRACTING DEVICE
John Q. Andrews, Des Moines, Iowa
Application July 1, 1955, Serial No. 519,439
3 Claims. (Cl. 294—50.8)

This invention relates generally to lawn and garden tools and more particularly to a weed extracting tool or device.

An object of this invention, therefore, is to provide an improved weed extracting device.

Another object of this invention is to provide a weed extracting device which includes a pair of oscillating jaws adapted to be inserted into the ground for cutting a weed root and then oscillated to grip the cut root therebetween so that the root may be easily picked from the ground.

A further object of this invention is to provide a weed extracting device which includes an elongated body portion having a pair of relatively movable jaws at one end and an actuating member for the jaws at the other end providing for operation of the jaws to cut and pick up a weed root from a standing position.

Another object of this invention is to provide a weed extracting device having a pair of rotatable weed cutting and engaging jaws which are readily rotated in response to translatory movement of an actuating member.

A further object of this invention is to provide a weed extracting device which is readily operable to pick up and then release weeds to be extracted from the ground.

Still a further object of this invention is to provide a weed extracting device which is simple in construction, economical to manufacture and efficient in operation to readily extract weeds without disturbing the soil adjacent the weeds.

Further objects, features and advantages of this invention will become apparent from a consideration of the following description when taken in connection with the accompanying drawing in which:

Fig. 1 is a perspective view of the weed extracting device of this invention;

Fig. 2 is a foreshortened enlarged side elevational view of the weed extracting device of this invention, with some parts broken away and other parts shown in section for the purpose of clarity;

Fig. 3 is an enlarged elevational view of the working end portion of the weed extracting device of this invention, with some parts broken away and other parts shown in section to better illustrate the construction of the device;

Fig. 4 is a transverse sectional view looking along the line 4—4 in Fig. 3 and

Fig. 5 is an end view of the working end portion of the device of this invention, showing moved positions of the jaw members in dotted lines.

With reference to the drawing, the weed extracting device of this invention, indicated generally at 10, is illustrated in Fig. 1 as including a tubular body member 11 having a head or jaw assembly 12 at its lower or working end and finger actuated grip members 13 at its upper or actuating end. The jaw assembly 12 includes a casing or support member 14 having an upper threaded end portion 16 threadably secured within an enlarged lower end portion 17 of the body member 11 so as to constitute an extension of the body member 11. A pair of parallel spaced shafts 18 rotatably suported within and extended longitudinally of the casing member 14 have end portions 21 projected upwardly from the casing 14 to a position within the lower end portion 17 of the body member 11. The projected upper shaft portions 21, are formed with peripheral recesses or grooves 22 for releasably receiving a bearing key 23 which rests on the casing end portion 16 and acts to maintain the shafts 18 against movement out of their supported positions within the casing 14.

The opposite or lower end portions 26 of the shafts 18 (Fig. 3) project downwardly from the lower end 27 of the casing member 14 and carry at their terminal ends 28 a pair of elongated flat jaw members 29, extended longitudinally of the shafts 18 and engaged at their upper ends in transversely extended slots 31 formed in the terminal ends 28 of the shafts 18. The jaws 29 terminate in pointed end portions 32 formed with inner cutting edges 33 and outer or gripping edges 34 serrated to facilitate a gripping engagement of the jaws 29 with a weed root to be extracted. Rollers 36 (Fig. 3) are rotatably received on the shafts 18 at positions between the lower end 27 of the casing member 14 and the upper ends of the jaws 29 for a purpose to appear later.

It can thus be seen that the jaws 29 are rotatable with the shafts 18. For rotating the shafts 18, a pair of spiral members 41 having relatively reversed flights 40 are secured to and extended upwardly and axially of the end portions 21 of the shafts 18. An actuating plate 42 (Figs. 3 and 4) formed with oppositely arranged slots 45, for loosely receiving the spiral members 41, is carried at the lower end of an actuating rod 43 (Figs. 2 and 3) arranged coaxially within the body member 11 and formed at its upper end with an eye 44. A pin 46 inserted through the eye 44 and movably mounted in axially extended slots 47 formed in opposite side walls of the body member 11 is secured at its ends to a tubular sleeve 48 mounted about the tubular body member 11 for up and down sliding movement thereon. Formed integral with the sleeve 48 are the finger grip members 13. A spring 51 within the tubular body member 11 is arranged in compression between the pin 46 and a cap 52 for the upper end of the body member 11 so as to bias the pin 46 to a position at the lower ends of the slots 47. This position of the pin 46 corresponds to the position of the spiral actuating plate 42 shown in solid lines in Fig. 3. The position of the plate 42 at the upper ends of the spirals 41, shown in dotted lines in Fig. 3, corresponds to a position of the pin 46 at the upper ends of the slots 47.

It is seen, therefore, that on movement of the finger grip members 13 toward the cap 52, the pin 46 is moved upwardly in the slots 47 against the pressure of the spring 51. As a result, the actuating rod 43 is moved upwardly in the body member 11 to in turn move the actuating plate 42 upwardly on the spirals 41 to thereby rotate the spirals 41 and in turn the jaws 29. By virtue of the relatively reversed flights 40, the spirals 41 are rotated in opposite directions to provide for corresponding reverse rotations of the shafts 18 and jaws 29.

In the lower positions of the grip members 13 and the plate 42, the jaw members 29 are in outwardly diverged positions shown in solid lines in Fig. 5, so that their inner edges 37 are in abutting engagement. As a result of the rotation of the shafts 18 in reversed directions, the jaw members 29 are moved toward the reversely inclined positions illustrated for the jaws 29 in dotted lines in Fig. 5. Thus, in response to an upward movement of the finger grip members 13 against the pressure of the compression spring 51, the jaw members 29 are rotated in directions to move the gripping edges 34 of the jaws 29 toward each other.

In the use of the weed extracting device 10, assume the jaw members 29 to be in their positions shown in Fig. 3, so that the jaws 29 are in a V-shape relation shown in full lines in Fig. 5 with their cutting edges 33 forming an inverted V-shape cutting knife, as illustrated in Fig. 3. The jaws 29 are then manually inserted into the ground surface so as to cut the root of a weed at an appreciable distance below the ground surface. To pick up the weed thus cut the fingers 13 are gripped and manually moved toward the cap 52 against the pressure of the spring 51 to thereby rotate the jaw members 29 in reversed directions providing for movement of the gripping edges 34 thereof toward each other to their positions shown in dotted lines in Fig. 5. The jaw edges 34 thus engage or grip opposite sides of the cut weed root. With manual pressure maintained on the finger members 13 the cut weed is picked from the ground for disposal into a suitable receptacle. On release of the finger grip members 13, the spring 51 moves the actuating rod 43 and the actuating plate 42 downwardly and rotates the spiral members 41, and the shafts 18 to return the jaws 29 to their full line positions shown in Fig. 5 to provide for the release of the cut weed from the jaws 29. Since the spring 51 functions with sufficient force to snap the jaws 29 to their open positions shown in Fig. 3, a weed root is thus easily shaken from the jaws 29 for ready disposal. During the gripping and releasing action of the jaws 29 the rollers 36 act to prevent any tangling of weeds about the shafts 18.

It is seen, therefore, that this invention provides a weed extracting device capable of being easily manipulated by one hand to cut a weed root, pick up the cut root, and then maintain the root on the device for transport to a disposal location, where the weed is readily released and dropped. Particularly it is to be noted, that by virtue of the length of the body member 11, and the complete manipulation of the device from the upper or actuating end thereof, the complete operation takes place with a minimum of stooping or bending over by the user of the device.

The device 10, is also readily useable as a soil aerator. By inserting the jaws 29 into the ground surface and manipulating the grip member 13 to rotate the jaws 29, air passages are readily formed in the ground.

Although the invention has been described with respect to a preferred embodiment thereof, it is to be understood that it is not to be so limited, since changes can be made therein which are within the full intended scope of this invention as defined by the appended claims.

I claim:

1. In a weed extracting device, an elongated tubular body member, working means at one end of said member including a tubular support member secured to said body member, a pair of parallel spaced shafts extended longitudinally of and projected outwardly of said support member, means on said support member rotatably supporting and maintaining said shafts against longitudinal movement, a pair of spiral members having relatively reversed flight portions secured to and extended axially of said shafts and positioned within said supporting member, an actuating plate movable longitudinally of said spiral members and having oppositely arranged slots through which said flight portions are respectively inserted, operating means secured to said actuating plate and arranged within said support member for movement axially thereof, spring means operatively associated with said operating means for moving said operating means and said actuating plate in one direction longitudinally of said spiral members, and a pair of flat jaw members secured to said shafts and extended longitudinally axially outwardly of said support member for rotation therewith in opposite directions between a plurality of positions in which parallel inner and outer edges of said jaw members are engaged with each other respectively, said inner edges being straight and said outer edges being serrated and longer than said inner edges, with a sharpened edge extended between the terminal ends of each set of inner and outer edges.

2. A weed extracting device comprising, an elongated hollow body member, a rod member extended longitudinally within said body member for reciprocating said rod member, working means mounted at the other end of said body member and including a tubular support member secured to said body member, a pair of parallel, transversely spaced shafts extended longitudinally of and projected outwardly from said support member, means on said support member rotatably supporting and maintaining said shafts against longitudinal movement, a pair of spiral members secured to said shafts at one end thereof, actuating means interconnecting said spiral members to said rod member for rotating said spiral members approximately ninety degrees in opposite directions upon a longitudinal stroke of said rod member in one direction, and a pair of flat elongated jaw members secured to and extended longitudinally from the other end of said shafts, each of said jaw members having parallel sides, one of which is longer than the other and having a serrated edge, and with a terminal point at the longer side formed by a sharpened edge extended between the terminal ends of said sides, said jaw members arranged in a substantially right angular relation in cross section and movable between a plurality of positions in two of which common sides of said jaw members are in longitudinal abutting relation, one position being such that said shorter other sides are abutting each other and with said sharpened edges forming an inverted V shape, another position being such that said serrated sides are abutting each other and with said sharpened edges forming a V shape.

3. A weed extracting device comprising, an elongated hollow body member, actuating means at one normally upper end of said body member and including a slot formed longitudinally in said body member, a finger grip device slidably mounted externally said body member, an elongated rod member extended axially within said body member, a pin element extended through said slot and connected between said finger grip device and said rod member at one end thereof, and a coil-spring interposed between said pin and the upper end of said body member which is closed whereby to bias said pin downwardly, said spring being compressible by movement of said finger grip device toward said closed upper end, and working means at the other normally lower end of said body member including a tubular support member secured to said body member, a pair of parallel, transversely spaced shafts extended longitudinally of and projected outwardly from said support member, means on said support member rotatably supporting and maintaining said shafts against longitudinal movement, an actuating plate carried on the end of said rod member at the lower end of said body member and having formed therein a pair of spaced, transversely aligned slots, a pair of spiral members secured to the upper ends of said shafts and inserted each through a slot, said spiral members having transversely aligned lower portions, and upper portions transversely aligned in a plane normal to that of said lower portions and with reversed flight portions therebetween, and a pair of flat rectangular jaw members secured to and extended longitudinally from the lower ends of said shafts, each jaw member terminating in a point by having one side longer than the other and with the edge of said longer side being serrated, said jaw members secured to said shafts in a transverse angular relationship such that when said actuating plate is in a lower biased position engaging said spiral member lower portions, said jaw member other sides are in an abutting relation, and when said actuating plate is raised by action of said finger grip device to oppositely rotate said spiral members, said jaw member serrated sides are in an abutting relation.

References Cited in the file of this patent

UNITED STATES PATENTS

| | | |
|---|---|---|
| 1,289,545 | Roberts | Dec. 31, 1918 |
| 1,551,783 | Baptie | Sept. 1, 1925 |
| 1,644,426 | Gentsch | Oct. 4, 1927 |
| 2,352,320 | Hatch | June 27, 1944 |
| 2,402,550 | Hiack | June 25, 1946 |

FOREIGN PATENTS

| | | |
|---|---|---|
| 177,384 | Great Britain | Mar. 30, 1922 |